US008428572B2

(12) United States Patent
Yuki

(10) Patent No.: US 8,428,572 B2
(45) Date of Patent: Apr. 23, 2013

(54) INFORMATION PROCESSING APPARATUS

(75) Inventor: Yoshinori Yuki, Fuchu (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 880 days.

(21) Appl. No.: 12/001,195

(22) Filed: Dec. 10, 2007

(65) Prior Publication Data

US 2009/0017813 A1 Jan. 15, 2009

(30) Foreign Application Priority Data

Jul. 10, 2007 (JP) ................................ P2007-180907

(51) Int. Cl.
*H04M 3/00* (2006.01)
(52) U.S. Cl.
USPC ....... 455/419; 455/575.1; 455/403; 455/41.3; 455/466; 455/469; 370/328; 370/260; 370/252; 370/473; 370/254; 370/229; 370/270; 370/351; 370/344; 370/230
(58) Field of Classification Search .................. 455/458, 455/41.3, 404, 466, 419, 569, 575.1, 403, 455/436, 567, 3; 370/206, 229, 270, 351, 370/344, 336, 230, 337, 328, 260, 252, 473, 370/254; 379/221; 709/205; 715/811, 810
See application file for complete search history.

(56) References Cited

U.S. PATENT DOCUMENTS

| 5,880,732 | A * | 3/1999 | Tryding ........................ 715/810 |
| 2004/0100505 | A1* | 5/2004 | Cazier .......................... 345/811 |
| 2005/0050135 | A1* | 3/2005 | Hallermeier ................. 709/200 |
| 2007/0229465 | A1* | 10/2007 | Sakai et al. .................... 345/173 |
| 2007/0234387 | A1* | 10/2007 | You ................................. 725/39 |
| 2008/0025196 | A1* | 1/2008 | Karaoguz et al. ............. 370/206 |
| 2008/0046239 | A1* | 2/2008 | Boo ............................. 704/235 |
| 2008/0098402 | A1* | 4/2008 | Lee et al. ...................... 718/104 |
| 2008/0163307 | A1* | 7/2008 | Coburn et al. .................. 725/61 |
| 2008/0280654 | A1* | 11/2008 | Solomon ..................... 455/569.1 |
| 2009/0015433 | A1* | 1/2009 | James et al. ............. 340/825.69 |
| 2010/0151915 | A1* | 6/2010 | Huisken ....................... 455/567 |

FOREIGN PATENT DOCUMENTS

| JP | 7-288874 A | 10/1995 |
| JP | 2006-319572 A | 11/2006 |

OTHER PUBLICATIONS

JP Office Action dated Oct. 11, 2011 as received in related application No. 2007-180907.

* cited by examiner

Primary Examiner — Joseph Arevalo
(74) Attorney, Agent, or Firm — Maschoff Brennan

(57) ABSTRACT

According to an aspect of the invention, there is provided an information processing apparatus in which a plurality of multimedia functions are installed and which is capable of wireless communication a counterpart apparatus, including: a setting unit configured to start up a multimedia function from the plurality of multimedia functions in accordance with a remote-control command sent from the counterpart apparatus; and a control unit configured to control a startup of the multimedia function in accordance with a startup made by the setting unit if the control unit receives the remote-control command.

3 Claims, 12 Drawing Sheets

FIG. 3A
FIG. 3B
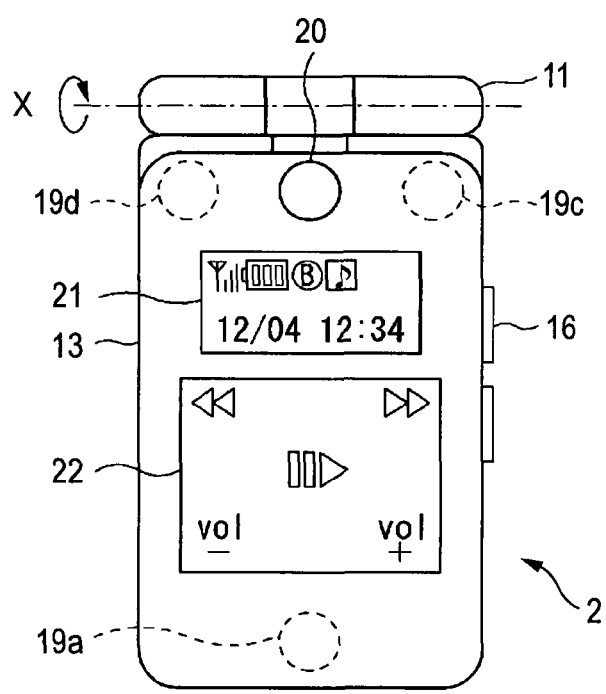
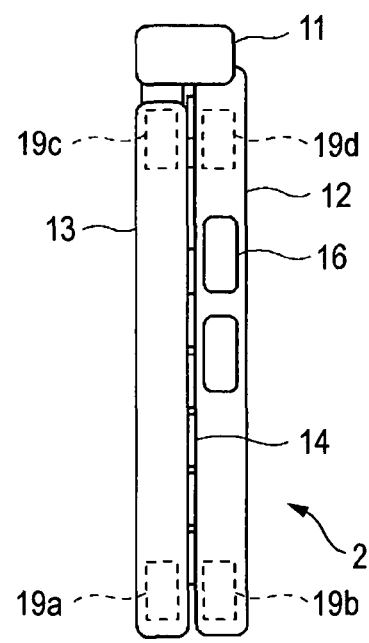

FIG. 7A

| CODE | FUNCTION |
|---|---|
| A | TERRESTRIAL DIGITAL |
| B | DIGITAL RADIO |
| C | FM RADIO |
| D | MUSIC PLAYER |

FIG. 7B

| PATTERN / PRIORITY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | A | A | A | A | A | A | B | B | B | B | B | B | C | C | C | C | C | C | D | D | D | D | D | D |
| 2 | B | B | C | C | D | D | A | A | C | C | D | D | A | A | B | B | D | D | A | A | B | B | C | C |
| 3 | C | D | B | D | B | C | C | D | A | D | A | C | B | D | A | D | A | B | B | C | A | C | A | B |
| 4 | D | C | D | B | C | B | D | C | D | A | C | A | D | B | D | A | B | A | C | B | C | A | B | A |

INFORMATION PROCESSING APPARATUS

CROSS-REFERENCE TO RELATED APPLICATIONS

This application is based on and claims the benefit of priority from the prior Japanese Patent Application No. 2007-180907, filed on Jul. 10, 2007; the entire contents of which are incorporated herein by reference.

TECHNICAL FIELD

The present invention relates to an information processing apparatus, and more particularly to an information processing apparatus whose multimedia function is to be controlled by using a remote control.

BACKGROUND

Recently, there is a tendency that the cellular phone, as an information processing apparatus, is installed with multimedia functions including the music control function of listening to audio data and the function of receiving terrestrial-digital, terrestrial-digital-radio and FM-radio broadcast waves, besides the address directory function, the mail function through base stations and networks such as the Internet, and the browser function for looking Web pages, in addition to the communicating function merely based on speech.

Meanwhile, as an art concerning a cellular phone installed with a multimedia function, it is disclosed by for example JP-A-2006-319572, that the user can easily know an arrival with interruption even when listening to a music through an apparatus connected to Bluetooth (registered mark).

Such a multimedia function can be controlled by the remote control provided for the headset worn on the user's head, for example. Where the multimedia function is under remote control, the application program having multimedia functions interprets a predetermined command received from the remote control so that the cellular phone can perform a predetermined operation depending upon the interpreted command.

However, conventionally, where multimedia function is started up by use of a remote control provided for the headset, startup is problematically available for only any one (e.g. music control function or a terrestrial digital broadcast wave receiving function) out of a plurality of multimedia functions that is previously determined between the remote control and the cellular phone.

Naturally, the remote control can be newly provided with a control mechanism for selecting a desired multimedia function, in order to cause a desired one of a plurality of multimedia functions to start up with use of the remote control provided for the headset. In this case, the cellular phone is also required to cope not only with the remote control but also with the remote control installed with the new control mechanism. Even in case such new control mechanism is installed on the remote control and cellular phone to be newly shipped into the market, any one of multimedia functions only can be started up on the existing, already shipped remote control not installed with a control mechanism for selecting a desired multimedia function.

SUMMARY

According to an aspect of the invention, there is provided an information processing apparatus in which a plurality of multimedia functions are installed and which is capable of wireless communicating a counterpart apparatus, including: a setting unit configured to start up a multimedia function from the plurality of multimedia functions in accordance with a remote-control command sent from the counterpart apparatus; and a control unit configured to control a startup of the multimedia function in accordance with a startup made by the setting unit if the control unit receives the remote-control command.

BRIEF DESCRIPTION OF THE DRAWINGS

In the accompanying drawings:

FIG. 3A, 3B are exemplary exterior views showing another appearance of a cellular phone applicable to an information processing apparatus according to the embodiment;

FIGS. 7A, 7B exemplary show a priority pattern in the case that multimedia function startup is established in priority-based setting;

DESCRIPTION OF THE EMBODIMENTS

Figure 1:
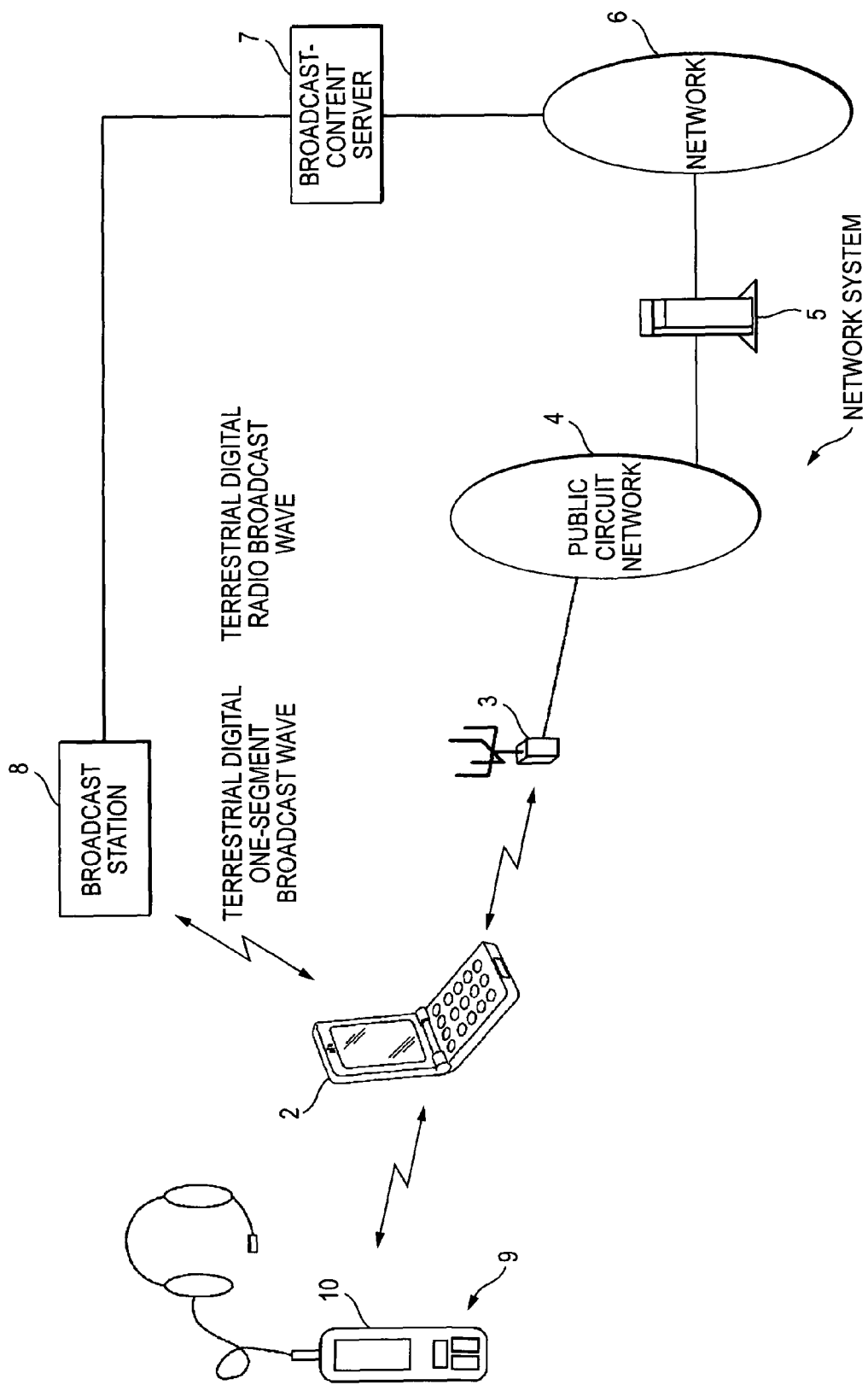
FIG. 1 is an exemplary diagram showing a schematic arrangement of a network system according to an embodiment.

While referring to the drawings, explanation will be made below on an embodiment according to the present invention. FIG. 1 represents an overall arrangement of a network system 1. As shown in FIG. 1, a broadcast station 8 is set up in a predetermined location on the network system 1. The broadcast station 8 is to send a terrestrial digital one-segment broadcast wave, a terrestrial digital broadcast wave or a terrestrial digital radio broadcast wave, in a predetermined range. A cellular phone 2, applicable for an information processing apparatus is to receive a terrestrial digital one-segment broadcast wave, a terrestrial digital broadcast wave or a terrestrial digital radio broadcast wave, from the broadcast station 8 through a terrestrial digital one-segment/radio receiving section (e.g. terrestrial digital one-segment/radio receiving section 49 in FIG. 4) incorporated therein.

Meanwhile, a base station 3 is arranged as a fixed wireless station on the network system 1. The cellular phone 2, that is a mobile wireless station, is allowed to wirelessly access the base station 3 according to the code division multiple access scheme called, for example, W-CDMA (wideband-code division multiple access).

Meanwhile, the base station 3 is connected to the public circuit network 4 through a wire line. The public circuit network 4 is connected with an access server 5 of an Internet service provider. The access server 5 is connected with a broadcast content server 7 and the like through a network 6.

In the vicinity of the cellular phone 2, a headset 9 is arranged to be applied as a counterpart apparatus n. The headset 9 is capable of receiving audio data (including those of audio data based on terrestrial digital one-segment and terrestrial digital radio broadcast waves) transferred from the cellular phone 2 through use of wireless communication and reproduce it in real time. Incidentally, the headset 9 is provided with a remote control 10 with which remote operation is available to the cellular phone 2 through wireless communication.

Figure 2A:
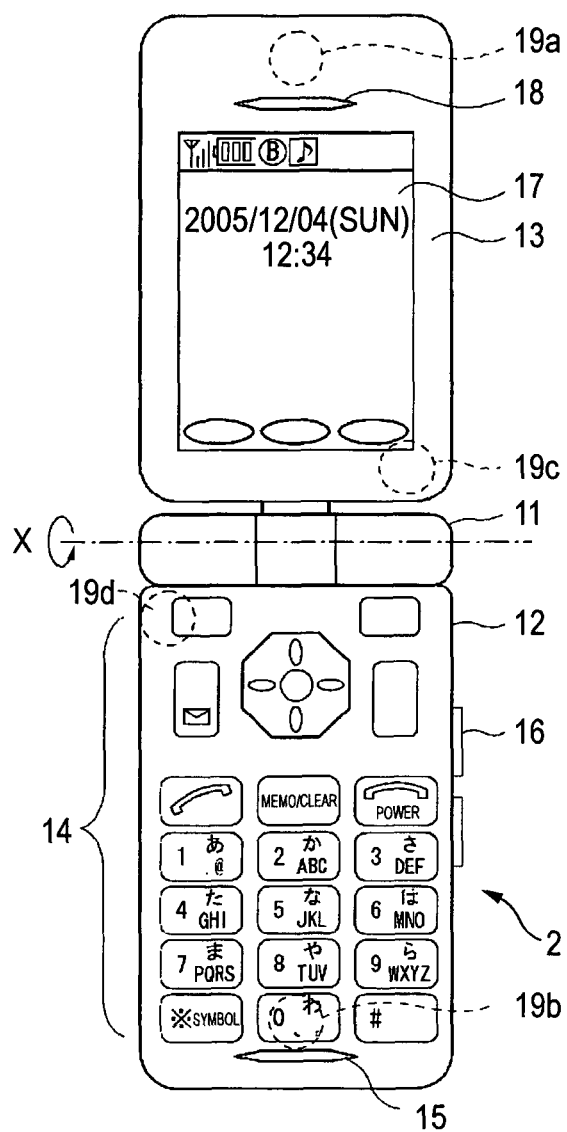
FIGS. 2A, 2B are exemplary exterior views showing an appearance of a cellular phone applicable to an information processing apparatus according to the embodiment.
Figure 2B:
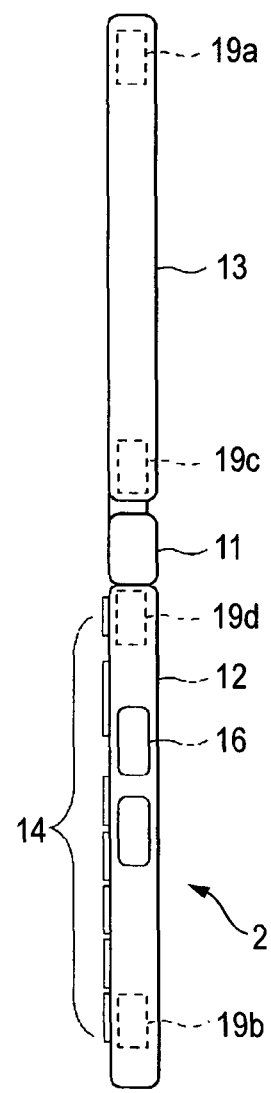

FIGS. 2A, 2B show an exterior arrangement of the cellular phone 2. Incidentally, FIG. 2A represents an exterior arrangement of the cellular phone 2 as viewed from front when opened at approximately 180 degrees while FIG. 2B represents an exterior arrangement of the cellular phone 2 as viewed from side when opened.

As shown in FIGS. 2A and 2B, the cellular phone 2 has a first housing 12 and a second housing 13 that are hinge-coupled together through a central hinge 11 on the border, thus being formed to be folded in a direction of arrow "x" through the hinge 11. In the cellular phone 2, an antenna for transmission and reception (antenna 44 in FIG. 4 referred later) is provided in a predetermined position thereof. Through the antenna incorporated, radio waves are to be sent and received to and from the base station 3.

The first housing 12, on its surface, is provided with operation keys 14 including "0" to "9" numeric keys, a call key, a redial key, a ring-off/power key, a clear key, and an electronic mail key. By using the operation keys 14, input can be made for various instructions.

On the first housing 12, a cross key and a fix key are provided as operation keys 14 in an upper region thereof. By user's operation on the cross key in directions of up, down, left and right, a cursor appearing can be moved in directions of up, down, left and right. Specifically, various operations are to be done, e.g. scrolling a telephone directory list or electronic mail being displayed on a liquid-crystal display 17 provided on the second housing 13, paging to a personal homepage and sending a picture.

Meanwhile, by pressing the fix key, fixing is available in various functions. For example, on the first housing 12, a desired telephone number is to be selected out of a plurality of telephone numbers in a telephone directory list being displayed on the liquid-crystal display 17 in accordance with user's operation on the cross key. When the fix key is pressed inward of the first housing 12, the selected telephone number is fixed to call the telephone number.

Furthermore, on the first housing 12, an electronic mail key is provided in a position left adjacent the cross and fix keys. The electronic mail key, if pressed inward of the first housing 12, invokes a mail send/receive function. A browser key is provided right adjacent the cross and fix keys. The browser key, if pressed inward of the first housing 12, allows for looking Web page data. Incidentally, the electronic mail and browser keys, provided adjacent left and right to the cross and fix keys, can be provided with various functions, e.g. "Yes" or "No" by a screen displayed on the liquid-crystal display 17, hence being referred to as soft 1 key and soft 2 key, respectively.

Meanwhile, a microphone 15 is provided on the first housing 12 in a position lower than the operation key 14. The microphone 15 is to collect user's voice during telephone talk. Meanwhile, a side key 16 is provided on the first housing 2, to operate the cellular phone 2.

Meanwhile, on the second housing 13, a liquid-crystal display 17 (main display) is provided in the front surface thereof. This makes it possible to display not only radio wave receiving conditions, battery remaining capacity, names and telephone numbers entered as telephone directories, and transmission history but also electronic mail contents, personal homepages, images taken by a CCD (charge coupled device) camera (CCD camera 20 in FIGS. 3A, 3B referred later), and contents received from an external content server (not shown), contents stored in a memory card (memory card 46 in FIG. 4 referred later). Meanwhile, a speaker 18 is provided in a predetermined position above the liquid-crystal display 17. This allows the user to have voice communications.

FIGS. 3A, 3B represent another exterior arrangement of the cellular phone 2. The cellular phone 2 in FIGS. 3A, 3B is in a state the cellular phone 2 in the state of FIGS. 2A, 2B is rotated in a direction of arrow X. Incidentally, FIG. 3A represents an exterior arrangement of the closed cellular phone 2 as viewed from front while FIG. 3B represents an exterior arrangement of the closed cellular phone 2 as viewed from side.

A CCD camera 20 is provided in an upper part of the second housing 13. This makes it possible to take an image of a desired photographic subject. A sub-display is provided in a position lower than the CCD camera 20, to display an antenna pictograph indicative of a current antenna sensitivity, a battery pictograph indicative of a current battery remaining capacity for the cellular phone 2, and a current time.

An electrostatic touch pad 22 is provided in a position lower than the sub-display 21. The electrostatic touch pad 22 is made as one sheet of touch pad in its appearance but provided with sensors, not shown, in plurality of points. In case the user touches a vicinity of the sensor, the sensor detects it thereby effecting rewind function, fast feed function, volume decrease operation, volume increase operation, reproducing and pause operations, etc.

Figure 4:
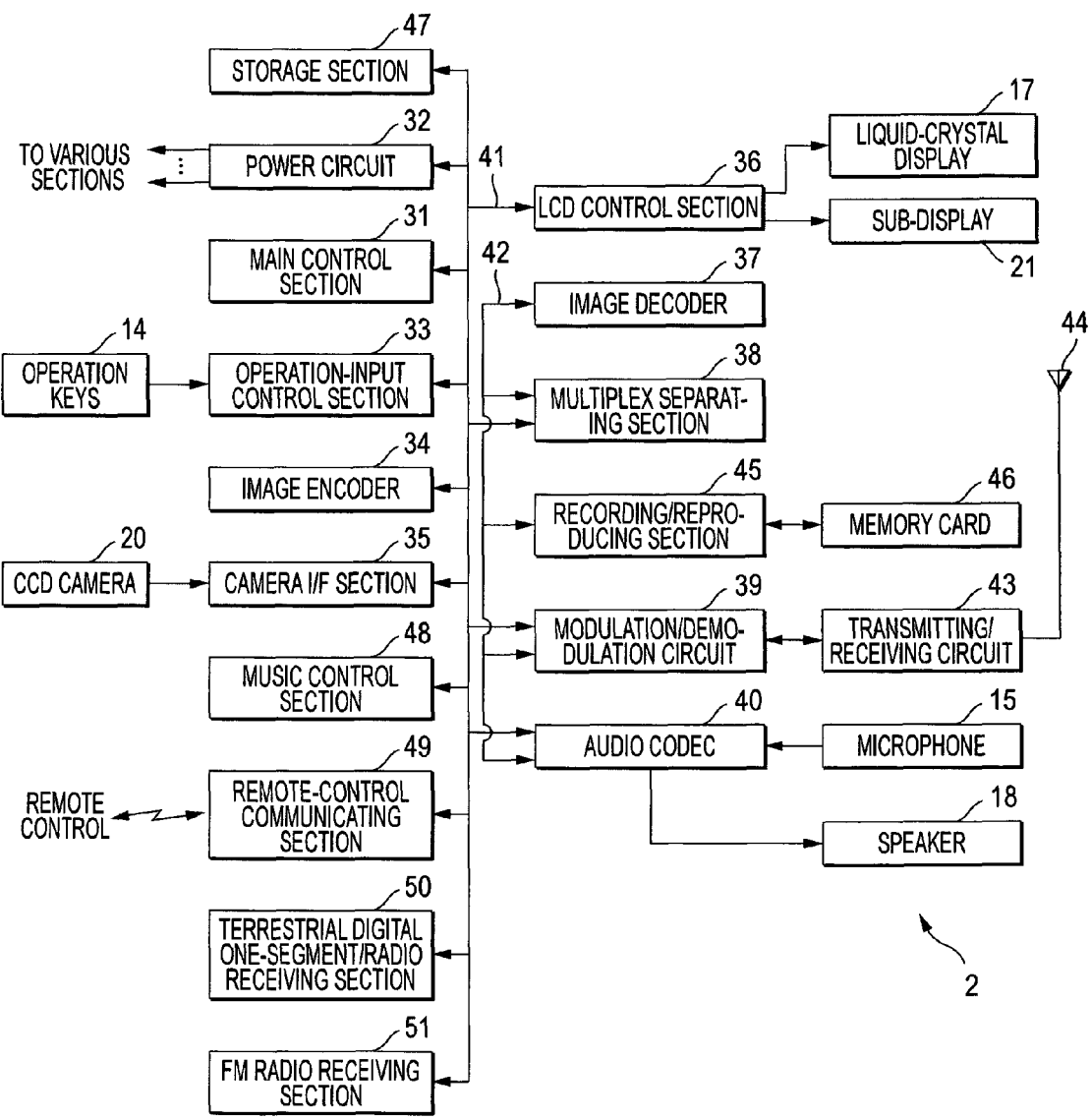
FIG. 4 shows an exemplary internal configuration of the cellular phone 2 to be applied as the information processing apparatus according to the embodiment.

FIG. 4 represents an internal configuration of the cellular phone 2 to be applied as the information processing apparatus. As shown in FIG. 4, the cellular phone 2 includes a main control section 31 that takes total control of the various sections of the first and second housings 12, 13 wherein a power-source circuit 32, an operation input control section 33, an image encoder 34, a camera interface section 35, an LCD (liquid-crystal display) control section 36, a multiplex separating section 38, a modulation/demodulation circuit 39, an audio codec 40 and a storage section 47 are connected one with another to the main control section 31 through a main bus 41. The image encoder 34, the image decoder 37, the multiplex separating section 38, the modulation/demodulation circuit 39, the audio codec 40 and a recording/reproducing section 45 are connected one with another through a synchronous bus 42.

The main control section 31 is configured with a CPU (central processing unit), a ROM (read only memory) and a RAM (random access memory). The CPU is to execute various processes according to the program stored in the ROM or the various application programs loaded in the RAM, and to generate various control signals and supply those to the various sections, thereby effecting total control of the cellular phone 2. The RAM is to properly store the data required for the CPU to execute various processes. Incidentally, the main control section 31 incorporates therein a timer to correctly measure the current data and time.

In the cellular phone 2, the audio codec 40 is to convert and compress the audio signal, collected by the microphone 15 in a voice communication mode, into a digital audio signal, under control of the main control section 31. The signal is spread-spectral processed by the modulation/demodulation circuit 39 and then digital-to-analog converted and frequency-converted by the transmitting/receiving circuit 43, then being sent through the antenna 44.

Meanwhile, in the cellular phone 2, the reception signal received at the antenna 44 in a voice communication mode is amplified and subjected to frequency and analog-to-digital conversions, subjected to inverted spread spectrum process by the modulation/demodulation circuit 39, and decompressed and converted into an analog signal by the audio codec 40. The converted analog audio signal is outputted through the speaker 18.

Furthermore, the cellular phone 2, in the case of sending an electronic mail in a data communication mode, delivers the text data of an electronic mail, inputted by operating the operation keys 14, to the main control section 31 through the operation-input control section 33. The main control section 31 subjects the text data to spread spectral process in the modulation/demodulation circuit 39 and to digital-to-analog and frequency conversions in the transmitting/receiving circuit 43, and then sent to the base station 3 through the antenna 44.

On the contrary, when receiving an electronic mail in a data communication mode, the cellular phone 2 at its modulation/demodulation circuit 39 performs spread spectrum process on the reception signal received from the base station 3 through the antenna 44 and restores the former text data that is thereafter displayed as an electronic mail on the liquid-crystal display 17 through the LCD control section 36.

When sending an image signal in a data communication mode, the cellular phone 2 supplies the image signal, taken by the CCD camera 20, to the image encoder through the camera interface 35.

The image encoder 34 is to encode, with compression, the image signal supplied from the CCD camera 20 according to a predetermined encode scheme, e.g. MPEG (moving picture experts group) 4, thereby converting it into a coded image signal and delivering the converted coded image signal to the multiplex separating section 38. Simultaneously with this, the cellular phone 2 delivers the speech, collected by the microphone 15 during imaging with the CCD camera 20, as a digital audio signal to the multiplex separating section 38 through the audio codec 40.

The multiplex separating section 38 is to multiplex the coded image signal supplied from the image encoder 34 and the audio signal supplied from the audio codec 40 together according to a predetermined scheme. The resulting multiplexed signal is subjected to spread spectrum process at the modulation/demodulation circuit 39 and then to digital-to-analog and frequency conversions at the transmitting/receiving circuit 43, then being sent through the antenna 44. On the other hand, the cellular phone 2 is allowed to receive Web page data in a data communication mode.

Meanwhile, when receiving the moving picture file data linked, for example, to a Web page in a data communication mode the cellular phone 2 subjects the reception signal received from the base station 3 through the antenna 44 to spread spectrum process at the modulation/demodulation circuit 39, and delivers the resulting multiplexed signal to the multiplex separating section 38.

The multiplex separating section 38 is to separate the multiplexed signal into a coded image signal and an audio signal and supply the coded image signal to the image decoder 37 through the synchronous bus 42 and the audio signal to the audio codec 40. The image decoder 37 is to decode the coded image signal according to a decode scheme corresponding to a predetermined encode scheme, e.g. MPEG 4, thereby producing a reproduced moving picture signal and supplying the reproduced moving picture signal to the liquid-crystal display 17 through the LCD control section 36. This displays the moving picture data contained in the moving picture file linked, for example, to a Web page.

Simultaneously with this, the audio codec 40 converts the audio signal into an analog audio signal and then supplies it to the speaker 18. This reproduces the audio signal contained in the moving picture file linked, for example, to a Web page.

The storage section 47 is formed by a flash memory as a non-volatile memory to be electrically rewritten and erased or an HDD (hard disc drive), thus being stored with various application programs and various data groups to be executed by the CPU of the main control section 31.

A music control section 48 is to take control of reproducing and pausing the audio data stored in the storage section 47 and executing rewind and fast feed functions and volume decreasing and increasing operations.

The remote-control communicating section 49 is formed by a module for performing wireless communication according to Bluetooth (registered trademark) for example, to have wireless communication with the headset 9 (particularly the remote control 10 provided for the headset 9) or the like present in the vicinity of the cellular phone 2. Naturally, it may use other type of wireless communication than Bluetooth (e.g. infrared communication).

A terrestrial digital one-segment receiving section 50 is to receive a terrestrial digital one-segment broadcast wave or terrestrial digital radio broadcast wave from the broadcast station 8 and supply the received terrestrial digital one-segment broadcast wave or terrestrial digital radio broadcast wave to the multiplex separating section 38 or storage section 47. An FM radio receiving section 51 is to receive an FM radio sent from a not-shown broadcast station.

Figure 5:
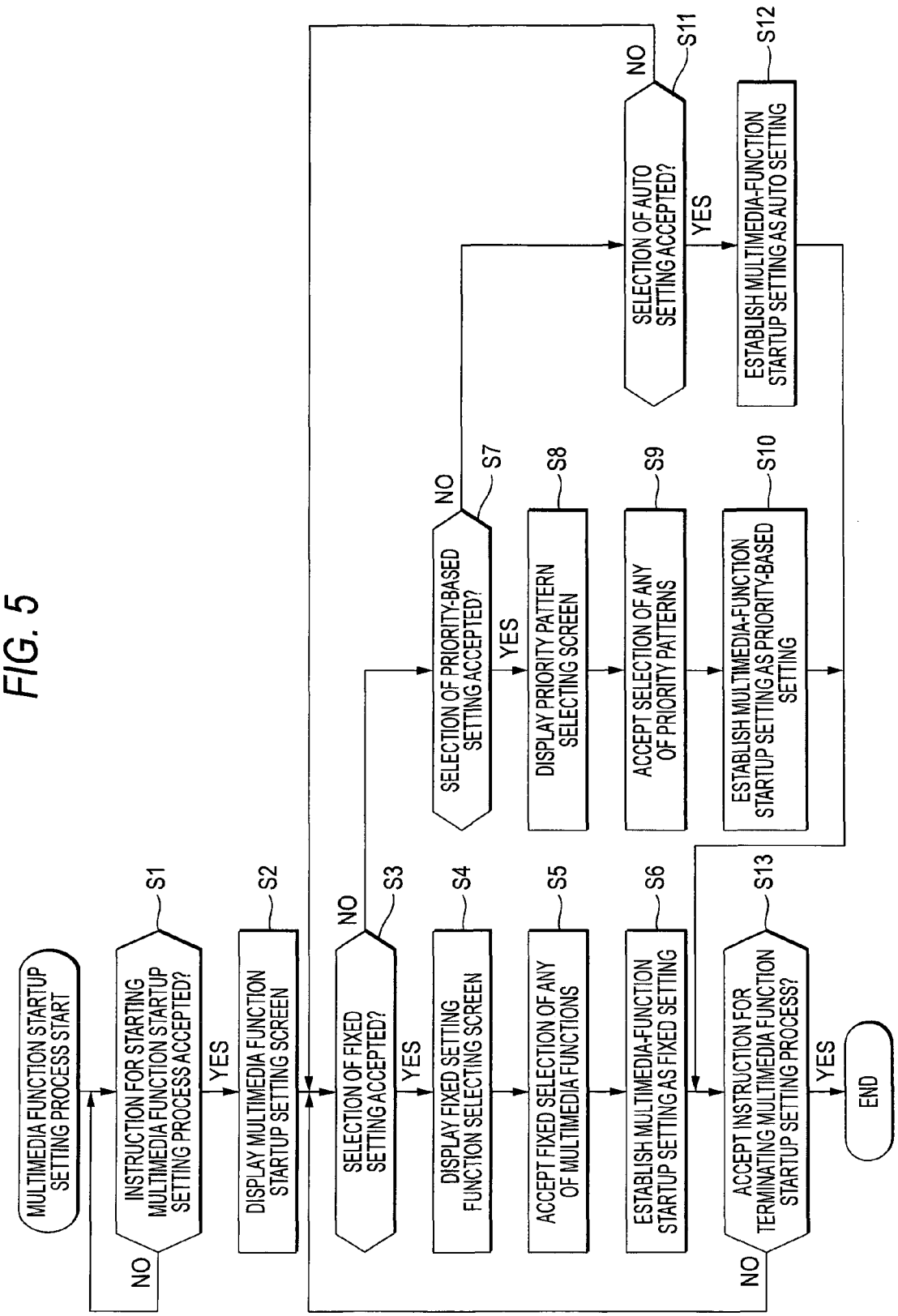
FIG. 5 is a flowchart explaining a multimedia function startup setting process in the cellular phone of FIG. 4.

Now, referring to a flowchart of FIG. 5, explanation is made on a multimedia function startup setting process for the cellular phone 2 of FIG. 4. The multimedia function startup setting process is started upon accepting an instruction for starting a multimedia function startup setting process, by user's operation on the operation keys 14.

At step S1, the main control section 31 determines whether or not accepted an instruction for starting a multimedia function startup setting process, depending upon user's operation on the operation key 14. It waits until determined that accepted an instruction for starting a multimedia function startup setting process.

In the case determined, at the step S1, that accepted an instruction for starting a multimedia function startup setting process, the main control section 31 at step S2 controls the LCD control section 36 to display, on the liquid-crystal display 17, a multimedia function startup setting screen for the user to establish a startup method of starting up a multimedia function on the cellular phone 2 by his/her operation of the remote control 10 provided for the headset 9. The liquid-crystal display 17 displays the multimedia function startup setting screen 55-*a* as shown in FIG. 6 for example, under control of the LCD control section 36.

Figure 6:
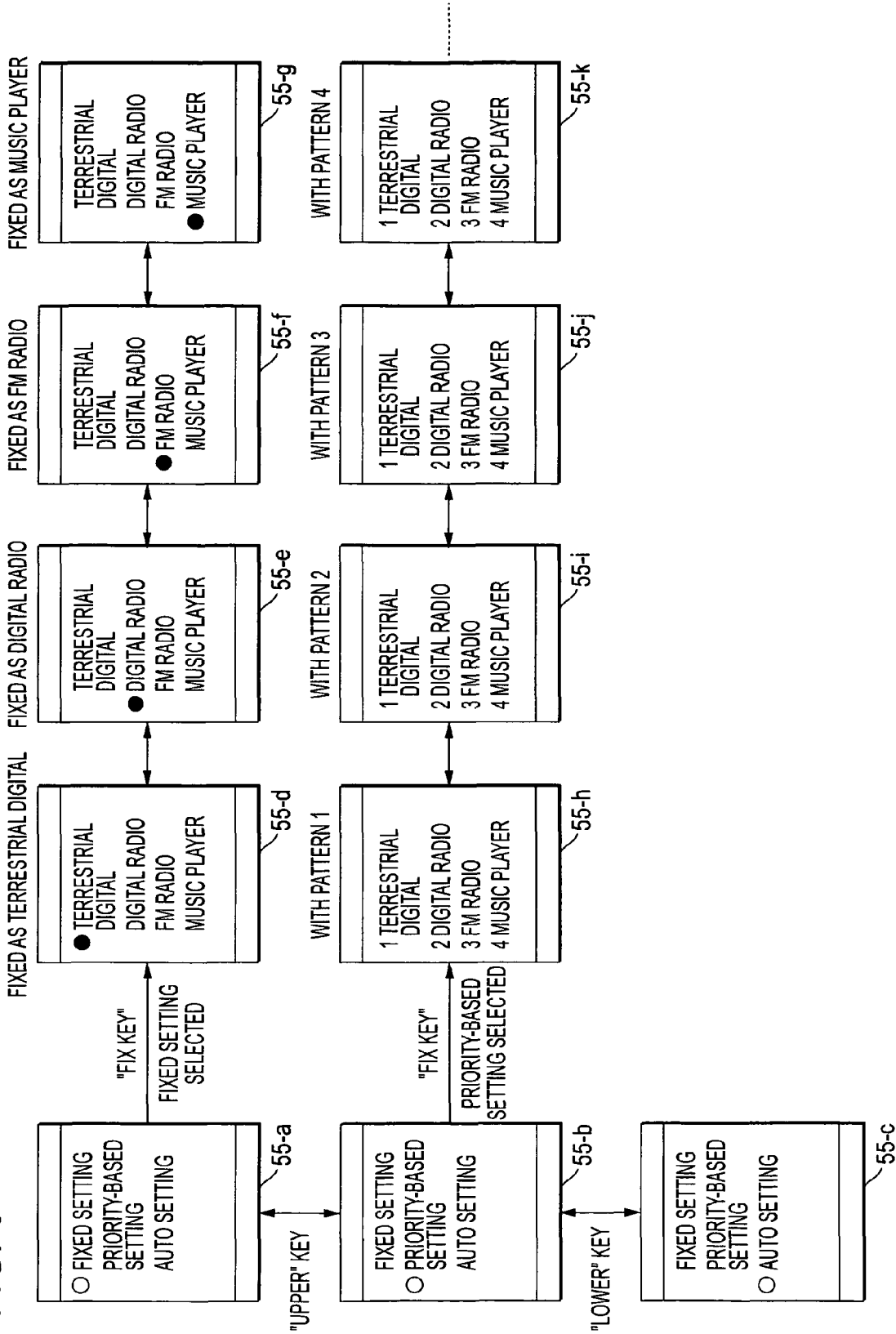
FIG. 6 shows a transition of the screen displayed on a liquid-crystal display upon establishing a multimedia function startup.

For example, in the case of a multimedia function startup setting screen 55-*a* of FIG. 6, user's operation of the remote control 10 provided for the headset 9 provides a display of "fixed setting", "priority-based setting" and "auto setting" as a method for starting up a multimedia function on the cellular phone 2. At this time, in order to indicate that the user is allowed to have "fixed setting" as a method of starting up a multimedia function by the subsequent operation, for example, of the fix key out of the operation keys 14, an icon indicative thereof is displayed in the vicinity of "fixed setting" out of the "fixed setting", "priority-based setting" and "auto setting" on the multimedia function startup setting screen 55-*a*. Naturally, focusing may be made to the "fixed setting" out of the "fixed setting", "priority-based setting" and "auto setting" on the multimedia function startup setting screen.

Incidentally, "fixed setting" is meant to establish a method of starting up any one of multimedia functions previously fixed by user's operation out of a plurality of multimedia functions installed on the cellular phone 2 when starting up a multimedia function on the cellular phone 2 due to user's operation of the remote control 10. "Priority-based setting" is meant to establish a method of starting up any one of multimedia functions out of the plurality of multimedia functions installed on the cellular phone 2 according to a priority previously established by user's operation when the user starts up the multimedia function on the cellular phone 2 by operating the remote control 10. "Auto setting" is meant to establish a method of starting up any one of multimedia functions out of the plurality of multimedia functions installed on the cellular phone 2 according to a radio-wave condition during startup when the user starts up the multimedia function on the cellular phone 2 by operating the remote control 10.

Thereafter, when the user presses, for example, a lower key out of the operation keys 14 on the multimedia function startup setting screen 55-*a*, the multimedia function startup setting screen 55-*a* transits into a multimedia function startup setting screen 55-*b* wherein an indicator icon is displayed in the vicinity of "priority-based setting" out of "fixed setting", "priority-based setting" and "auto setting" on the multimedia function startup screen 55-*b*. In case the user presses again, for example, the upper key or the lower key out of the operation keys 14 in the similar manner, the screen displayed on the liquid-crystal display 17 properly transits between multimedia function startup setting screens 55-*a* to 55-*c*.

At step S3, by user's operation, for example, of the fix key out of the operation keys 14 through the operation-input control section 33, the main control section 31 determines whether or not accepted a selection of fixed setting on the multimedia function startup setting screen (multimedia function startup setting screen 55-*a*) displayed on the liquid-crystal display 17. In the case determined, at the step S3, that accepted a selection of fixed setting on the multimedia function startup setting screen (multimedia function startup setting screen 55-*a*) displayed on the liquid-crystal display 17, the main control section 31 at step S4 controls the LCD control section 36 to display, on the liquid-crystal display 17, a fixed-setting-function selecting screen 55-*d* for selecting any multimedia function for fixed startup out of a plurality of multimedia functions when starting up a multimedia function on the cellular phone 2 by user's operation of the remote control 10. The liquid-crystal display 17 displays the fixed-setting-function selecting screen 55-*d* as shown in FIG. 6 for example, under control of the LCD control section 36.

For example, in the case of the fixed-setting-function selecting screen 55-*d* in FIG. 6, "terrestrial digital (function concerned with a terrestrial digital one-segment broadcast wave)", "digital radio (function concerned with a terrestrial digital radio broadcast wave)", "FM radio (function concerned with FM radio)" and "music player" are displayed as any of multimedia function to fixedly start up out of a plurality of multimedia functions when the user starts up the multimedia function on the cellular phone 2 by operating the remote control 10. At this time, in order to indicate that the user is allowed to select "terrestrial digital (function concerned with a terrestrial digital one-segment broadcast wave)" as a multimedia function to be fixingly started up by his/her subsequent operation, for example, of the fix key out of the operation keys 14, an icon indicative thereof is displayed in the vicinity of the "terrestrial digital" out of the "terrestrial digital", "digital radio", "FM radio" and "music player" on the fixed-setting-function selecting screen 55-*d*.

Thereafter, when the user presses, for example, the lower key out of the operation keys 14 on the fixed-setting-function selecting screen 55-*d*, the fixed-setting-function selecting screen 55-*d* transits into a fixed-setting-function selecting screen 55-*e* wherein an indicative icon is displayed in the vicinity of "digital radio" out of "terrestrial digital", "digital radio", "FM radio" and "music player" on the fixed-setting-function selecting screen 55-*e*. Incidentally, in case the user presses again, for example, the upper key or the lower key out of the operation keys 14 in the similar manner, the screen displayed on the liquid-crystal display 17 properly transits between the fixed-setting-function selecting screens 55-*d* to 55-*g*. This allows the user to select "terrestrial digital", "digital radio", "FM radio" or "music player" as a multimedia function to be fixedly started up by his/her operation, for example, of the fix key out of the operation keys 14.

At step S5, by user's operation of the operation keys 14 through the operation-input control section 33, the main control section 31 accepts a selection of fixed setting of any one to be fixedly started up out of a plurality of multimedia functions, on any of the fixed-setting-function selecting screens 55-*d* to 55-*g*. Namely, a selection of "terrestrial digital", "digital radio", "FM radio" or "music player" is accepted as a multimedia function for fixed startup.

At step S6, the main control section 31 provides a fixed setting to start up the multimedia function installed on the cellular phone 2 upon user's starting up of the multimedia function on the cellular phone 2 due to operating the remote control 10, based on any of the multimedia functions (e.g. "terrestrial digital", "digital radio", "FM radio" or "music player") accepted a selection on any of the fixed-setting-function selecting screens 55-*d* to 55-*g*. The main control section 31 stores the setting information (setting information concerned with fixed setting) about startup setting of the multimedia function.

For example, in the case accepted a selection of "terrestrial digital" as a multimedia function to fixedly start up out of a plurality of multimedia functions on the fixed-setting-function selecting screen 55-*d*, the startup setting for starting up the multimedia function installed on the cellular phone 2 upon starting the multimedia function on the cellular phone 2 due to user's operation of the remote control 10 is established as fixed setting for starting up a multimedia function of "terrestrial digital" previously fixed by user's operation out of a plurality of multimedia functions installed on the cellular phone in starting up the multimedia function. Incidentally, this is true for the case that a selection of a function other than "terrestrial digital" is accepted as a multimedia function to fixedly start up out of a plurality of multimedia functions. Thereafter, the process proceeds to step S13.

Meanwhile, when determined at the step S3 that not accepted a selection of fixed setting on the multimedia function startup setting screen (multimedia function startup setting screen 55-*a*) displayed on the liquid-crystal display 17, the main control section 31 at step S7 determines whether or not a selection of priority-based setting was accepted on the multimedia function startup setting screen (multimedia function startup setting screen 55-*b*) displayed on the liquid-crystal display 17 by user's operation, for example, of the fix key out of the operation keys 14 through the operation-input control section 33. When determined at step S7 that a selection of priority-based setting was accepted on the multimedia function startup setting screen (multimedia function startup setting screen 55-*b*) displayed on the liquid-crystal display 17, the main control section 31 at step S8 controls the LCD control section 36 to display, on the liquid-crystal display 17, a priority-pattern selecting screen 55-*h* for selecting a priority pattern as to which one is to be started up with priority out of the plurality of multimedia functions installed on the cellular phone 2 when the user starts up the multimedia function on the cellular phone 2 by operating the remote control 10. The liquid-crystal display 17 displays the priority-pattern selecting screen 55-*h* as shown in FIG. 6 for example, under control of the LCD control section 36.

For example, in the case of the priority pattern selecting screen in FIG. 6, displayed are "terrestrial digital (function concerned with a terrestrial digital one-segment broadcast wave)" (priority 1), "digital radio (function concerned with a terrestrial digital radio broadcast wave)" (priority 2), "FM radio (function concerned with FM radio)" (priority 3) and "music player" (priority 4) in the higher order of priority as a priority pattern as to which one is to be started up with priority out of the plurality of multimedia functions installed on the cellular phone 2 upon user's starting up of the multimedia function on the cellular phone 2 by operating the remote control 10. At this time, by user's subsequent operation, for example, of the fix key out of the operation keys 14, the user is allowed to select a pattern of "terrestrial digital"→"digital radio"→"FM radio"→"music player" as a priority pattern as to which one is to be started up with priority out of the plurality of multimedia functions installed on the cellular phone 2 when the user starts up the multimedia function on the cellular phone 2 by operating the remote control 10.

Thereafter, in case the user presses, for example, the lower key out of the operation keys 14 on the priority pattern selecting screen 55-*h*, the priority pattern selecting screen 55-*h* transits into a priority pattern selecting screen 55-*i*. Simultaneously, on the priority pattern selecting screen 55-*i*, displayed are "terrestrial digital (function concerned with a terrestrial digital one-segment broadcast wave)" (priority 1), "digital radio (function concerned with a terrestrial digital radio broadcast wave)" (priority 2), "music player" (priority 3) and "FM radio (function concerned with FM radio)" (priority 4) in the higher order of priority as a priority pattern as to which one is to be started up with priority out of the plurality of multimedia functions. Incidentally, as for the priority patterns as to which one is to be started up with priority out of the plurality of multimedia functions, twenty-four types of different priority patterns are previously prepared as shown in FIGS. 7A and 7B for example. For example, for the priority pattern 11 shown in FIG. 7B, the priority pattern as to which one is to be started up with priority is provided as "digital radio" "digital radio"→"music player"→"terrestrial digital"→"FM radio" in the higher order of priority. This is true for the other patterns of priority.

In case the user presses again, for example, the upper/lower key (or left/right key) out of the operation keys 14 similarly, the screen displayed on the liquid-crystal display 17 properly transits between the priority pattern selecting screens 55-*h* to 55-*k* in accordance with the operation. Due to this, the user is allowed to select a desired pattern (e.g. "terrestrial digital"→"digital radio"→"FM radio"→"music player" in the higher order of priority) out of the twenty-four types of previous stored different patterns, as a priority pattern as to which one is to be started up with priority out of the plurality of multimedia functions installed on the cellular phone 2 upon user's starting up of the multimedia function on the cellular phone 2 by operating the remote control 10 through operating, for example, fix key out of the operation keys 14.

At step S9, by user's operation of the operation key 14 through the operation-input control section 33, the main control section 31 accepts a selection of any priority pattern, as a priority pattern as to which one is to be started up with priority out of the plurality of multimedia functions installed on the cellular phone 2, on any of the priority pattern selecting patterns 55-*h* to 55-*k*. Namely, out of the twenty-four different patterns previously prepared, a selection of a desired pattern (e.g. a pattern of "terrestrial digital"→"digital radio"→"FM radio"→"music player" in the higher order of priority) is accepted.

At step S10, depending upon any priority pattern (e.g. a pattern of "terrestrial digital"→"digital radio"→"FM radio"→"music player" in the higher order of priority) accepted a selection on any of the priority pattern selecting screens 55-*h* to 55-*k*, the main control section 31 makes, as priority-based setting, the startup setting for starting up the multimedia function installed on the cellular phone 2 in starting up the multimedia function on the cellular phone 2 due to user's operation of the remote control 10. The main control section 31 stores, in the storage section 47, the setting information about the startup setting of multimedia function (setting information about priority-based setting).

For example, in the case accepted a selection of a pattern of "terrestrial digital"→"digital radio"→"FM radio"→"music player" in the higher order of priority as a priority pattern as to which one is to be started up with priority out of the plurality of multimedia functions installed on the cellular phone 2 on the priority pattern selecting screen 55-*h*, the startup setting for starting up the multimedia function installed on the cellular phone 2 in starting up the multimedia function on the cellular phone 2 due to user's operation of the remote control 10 is established as priority-based setting for starting up the multimedia function depending upon the priority ("terrestrial digital"→"digital radio"→"FM radio"→"music player" in the higher order of priority) previously set by user's operation out of the plurality of multimedia functions installed on the cellular phone 2 in starting up the multimedia function. Incidentally, this is true for the case that a selection of another pattern of priority is accepted as a priority pattern as to which one is to be started up with priority out of the plurality of multimedia functions installed on the cellular phone 2. Thereafter, the process proceeds to step S13.

Meanwhile, when determined, at the step S7, that not accepted a selection of priority-based setting on the multimedia function startup setting screen (multimedia function startup setting screen 55-*b*) displayed on the liquid-crystal display 17, the main control section 31 at step S11 determines whether or not accepted a selection of auto setting on the multimedia function startup setting screen (multimedia function startup setting screen 55-*c*) displayed on the liquid-crystal display 17 by user's operation, for example, of fix key out of the operation keys 14 through the operation-input control section 33.

When determined, at the step S11, that accepted a selection of auto setting on the multimedia function startup setting screen (multimedia function startup setting screen 55-*b*) displayed on the liquid-crystal display 17, the main control section 31 at step S12 establishes, as auto setting, the startup setting for starting up the multimedia function installed on the cellular phone upon starting up the multimedia function on the cellular phone 2 due to user's operation of the remote control 10.

Namely, the startup setting is established to automatically start up any one of a plurality of multimedia functions installed on the cellular phone 2 in accordance with the radio-wave condition, etc. at a startup when the user starts up the multimedia function on the cellular phone 2 by operating the remote control 10. The main control section 31 stores, in the storage section 47, the setting information (setting information about auto setting) about startup setting of multimedia function. Thereafter, the process proceeds to the step S13.

When determined, at the step S11, that not accepted a selection of auto setting on the multimedia function startup setting screen (multimedia function startup setting screen 55-c) displayed on the liquid-crystal display 17, the process returns to the step S3, to repeatedly execute the process of the step S3 and the following.

At the step S13, the main control section 31 determines whether or not accepted an instruction for terminating the multimedia function startup setting process depending upon the user's operation of the operation key 14. When determined, at the step S13, that not accepted an instruction for terminating the multimedia function startup setting process, the process returns to the step S3, to repeatedly execute the process of the step S3 and the following.

Meanwhile, when determined, at the step S13, that accepted an instruction for terminating the multimedia function startup setting process, the multimedia function startup setting process is terminated.

Figure 8:
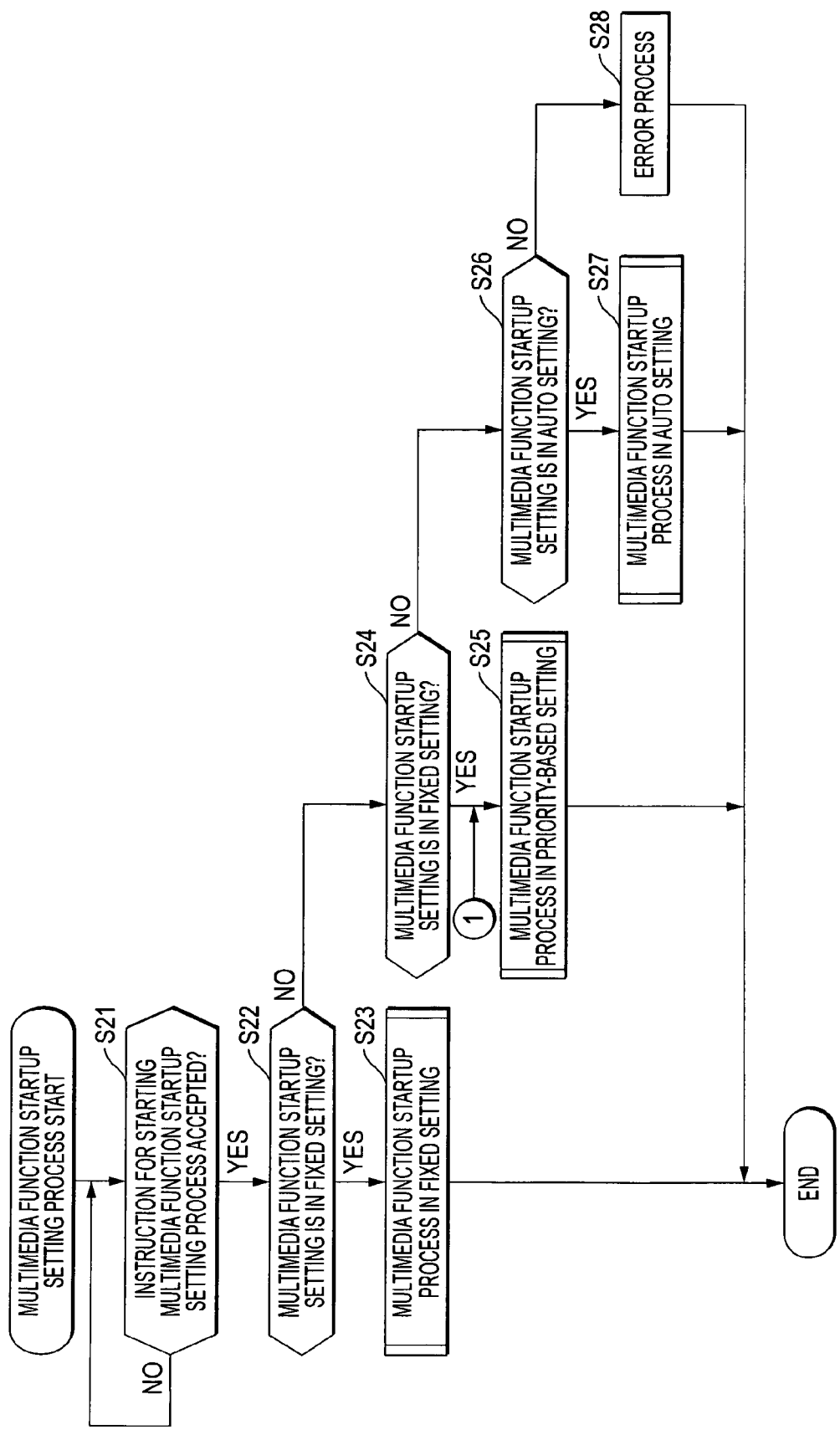
FIG. 8 exemplary shows a flowchart explaining a multimedia function startup control process in the cellular phone of FIG. 4.

Referring to a flowchart of FIG. 8, explanation is now made on a multimedia function startup control process for the cellular phone 2 of FIGS. 2A, 2B. The multimedia function startup control process is started upon receiving an instruction for starting a multimedia function startup control process at the cellular phone 2 through the remote-control communicating section 49 due to user's operation of a startup button (not shown) on the remote control 10 provided for the headset 9.

At step S21, the main control section 31 determines whether or not accepted an instruction for starting a multimedia function startup control process through the remote-control communicating section 49 depending upon user's operation of the startup button (not shown) on the remote control 10 provided for the headset 9. It waits until determines that accepted an instruction for starting a multimedia function startup control process.

When determined, at the step S21, that accepted an instruction for starting a multimedia function startup control process, the main control section 31 at step S22 determines whether or not the startup setting of multimedia function is established as fixed setting depending upon the setting information about startup setting of multimedia function stored in the storage section 47.

When determined, at the step S22, that the startup setting of the multimedia function is established as fixed setting, the main control section 31 at step S23 executes a multimedia function startup control process established as fixed setting. The detail of the multimedia function startup control process in fixed setting is shown in a flowchart of FIG. 9.

Figure 9:
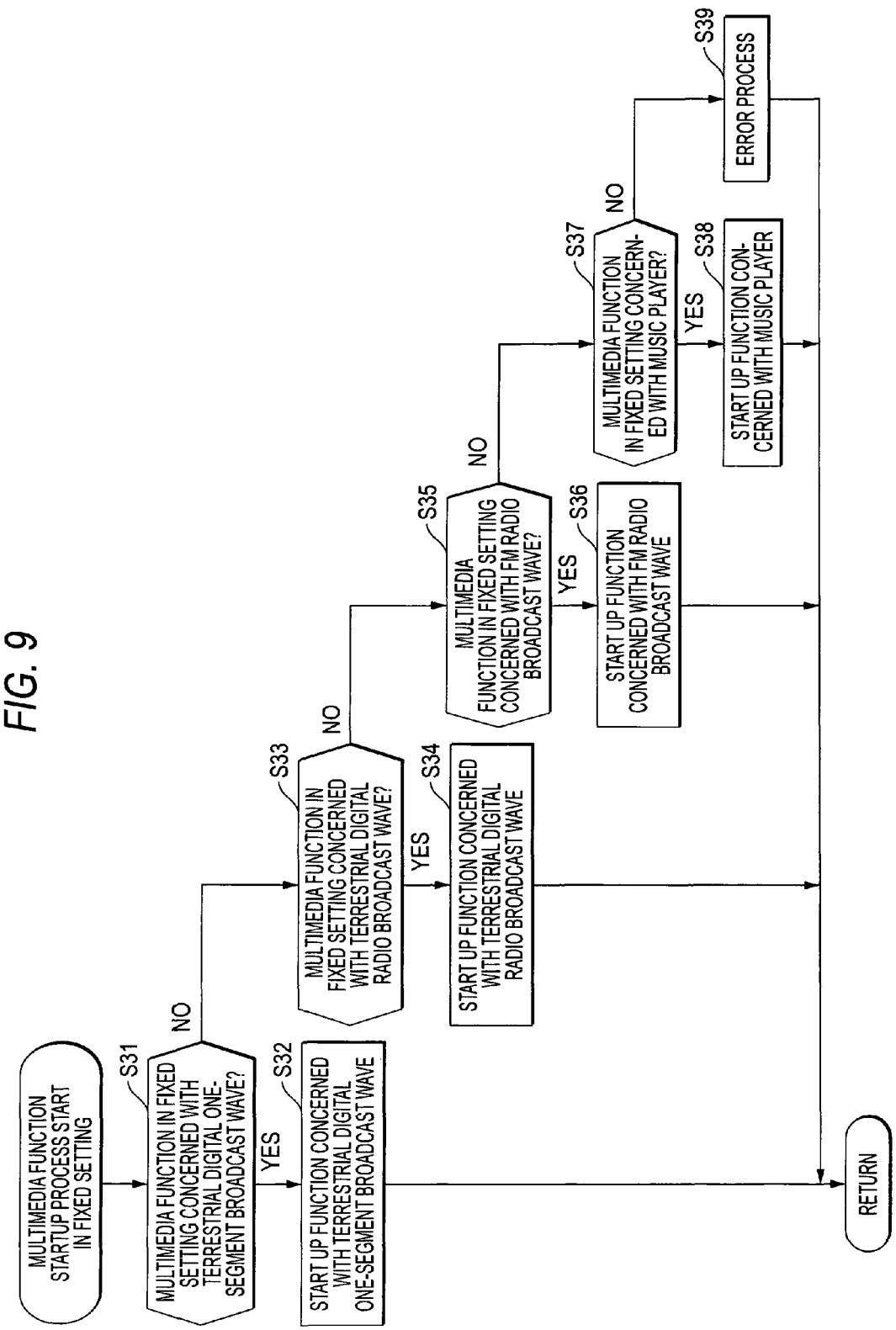
FIG. 9 is an exemplary flowchart explaining the detail of a multimedia function startup setting process in the cellular phone of FIG. 4.

Referring to the flowchart of FIG. 9, explanation is now made on the detail of the multimedia function startup control process in fixed setting on the cellular phone 2 of FIG. 4. At step S31, the main control section determines whether or not the multimedia function in fixed setting is for "terrestrial digital (function concerned with a terrestrial digital one-segment broadcast wave)" depending upon the setting information about startup setting of multimedia function stored in the storage section 47.

When the multimedia function in fixed setting is determined for "terrestrial digital (function concerned with a terrestrial digital one-segment broadcast wave)" at the step S31, the main control section 31 at step S32 controls the terrestrial digital one-segment/radio receiving section 50 to start up the function concerned with a terrestrial digital one-segment broadcast wave. This makes it possible to receive a terrestrial digital one-segment broadcast wave from the base station 8, display the moving picture based on the received terrestrial digital one-segment broadcast wave on the liquid-crystal display 17, and transfer the speech (audio data) based on the received terrestrial digital one-segment broadcast wave to the headset 9 through near-distance wireless communication. Thereafter, the process returns to FIG. 8 thus terminating the multimedia function startup control process.

Meanwhile, when the multimedia function in fixed setting is determined not for "terrestrial digital (function concerned with a terrestrial digital one-segment broadcast wave)" at the step S31, the main control section 31 at step S33 determines whether or not the multimedia function in fixed setting is for "digital radio (function concerned with a terrestrial digital radio broadcast wave)" depending upon the setting information about startup setting of multimedia function stored in the storage section 47.

When the multimedia function in fixed setting is determined for "digital radio (function concerned with a terrestrial digital radio broadcast wave)" at the step S33, the main control section 31 at step S34 controls the terrestrial digital one-segment/radio receiving section 50 to start up the function concerned with a terrestrial digital radio broadcast wave. This makes it possible to receive a terrestrial digital radio broadcast wave from the base station 8 and transfer the speech (audio data) based on the received terrestrial digital radio broadcast wave to the headset 9 through near-distance wireless communication. Thereafter, the process returns to FIG. 8 thus terminating the multimedia function startup control process.

When the multimedia function in fixed setting is determined not for "digital radio (function concerned with a terrestrial digital radio broadcast wave)" at the step S33, the main control section 31 at step S35 determines whether or not the multimedia function in fixed setting is for "FM radio (function concerned with an FM radio broadcast wave)" depending upon the setting information about startup setting of multimedia function stored in the storage section 47. When the multimedia function in fixed setting is for "FM radio (function concerned with an FM radio broadcast wave)" at the step S35, the main control section 31 at step S36 controls the FM radio receiving section 51 to start up the function concerned with an FM radio broadcast wave. This makes it possible to receive an FM radio sent from a not-shown broadcast station and transfer the speech (audio signal) based on the received FM radio broadcast wave to the headset 9 through near-distance wireless communication. Thereafter, the process returns to FIG. 8 thus terminating the multimedia function startup control process.

When the multimedia function in fixed setting is determined not for "FM radio (function concerned with an FM radio broadcast wave)" at the step S35, the main control section 31 at step S37 determines whether or not the multimedia function in fixed setting is determined for "music player (function concerned with a music player)" depending upon the setting information about startup setting of multimedia function stored in the storage section 47. When determined that the multimedia function in fixed setting is for "music player (function concerned with a music player)" at the step S37, the main control section 31 at step S38 controls the music control section 48 to start up the function concerned with a music player. This makes it possible to transfer the audio data previously stored in the storage section 47 to the headset 9 through near-distance wireless communication. Thereafter, the process returns to FIG. 8 thus terminating the multimedia function startup control process.

When determined that the multimedia function in fixed setting is not for "music player (function concerned with a music player)" at the step S37, the main control section 31 at step S39 executes an error process. Thereafter, the process returns to FIG. 8 thus terminating the multimedia function startup control process.

Referring back to FIG. 8, when determined that the startup setting of multimedia function is not in fixed setting at the step S22, the main control section at step S24 determines whether or not the startup setting of multimedia function is in priority-based setting depending upon the setting information about startup setting of multimedia function stored in the storage section 47. When determined that the startup setting of multimedia function is in priority-based setting, the main control section 31 at step S25 executes a multimedia function startup process under priority-based setting. The detail of the multimedia function startup process in priority-based setting is shown in a flowchart of FIG. 10.

Figure 10:
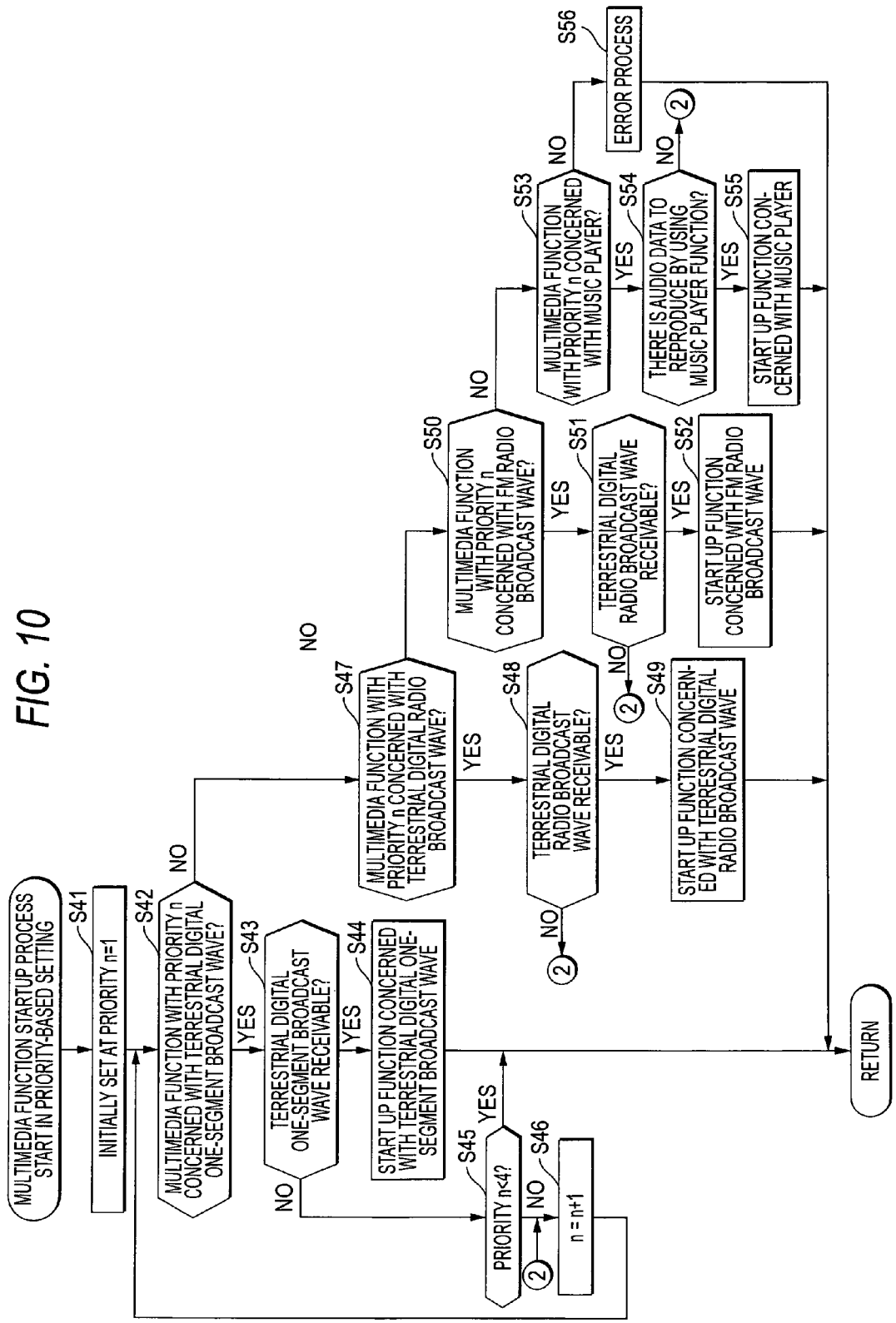
FIG. 10 is an exemplary flowchart explaining the detail of the multimedia function startup setting process under priority-based setting at step S25 in FIG. 8.

Referring to the flowchart of FIG. 10, explanation is made on the detail of the multimedia function startup process in priority-based setting on the cellular phone 2. At step S41, the main control section 31 initially sets at 1 (priority n=1) the priority n for use in a multimedia function startup process in priority-based setting. At step S42, the main control section 31 determines whether or not the multimedia function with priority n is for "terrestrial digital (function concerned with a terrestrial digital one-segment broadcast wave) depending upon the priority pattern contained in the setting information about startup setting of multimedia function (setting information about priority-based setting) stored in the storage section 47. Namely, in the case of a priority n=1, determination is made as to whether or not the multimedia function with a priority 1 is for "terrestrial digital (function concerned with a terrestrial wave one-segment broadcast wave)" depending upon the priority pattern contained in the setting information about priority-based setting. Likewise, in the case of a priority n=2, determination is made as to whether or not the multimedia function with a priority 2 is for "terrestrial digital (function concerned with a terrestrial wave one-segment broadcast wave)" depending upon the priority pattern contained in the setting information about priority-based setting. This is similar for the case of a priority n=3 or 4.

When determined at the step S42 that the multimedia function with a priority n is for "terrestrial digital (function concerned with a terrestrial digital one-segment broadcast wave)", the main control section 31 at step S43 controls the terrestrial digital one-segment/radio receiving section 50 and determines whether or not allowed to receive a terrestrial digital one-segment broadcast wave. Specifically, the main control section 31 tries to receive a terrestrial digital one-segment broadcast wave from the broadcast station 8 at the terrestrial digital one-segment/radio receiving section 50 and determines whether or not acquired, at that time, a multiplexed signal (elementary stream) at the multiplex separating section 38, thereby determining whether or not allowed to receive a terrestrial digital one-segment broadcast wave. When acquired a multiplexed signal (elementary stream) at the multiplex separating section 38, it is determined possible to receive a terrestrial digital one-segment broadcast wave. Meanwhile, when not allowed to acquire a multiplexed signal (elementary stream) at the multiplex separating section 38, the main control section 31 determines it impossible to receive a terrestrial digital one-segment broadcast wave.

It is natural that, even when received a multiplexed signal (elementary stream) at the multiplex separating section 38, it is difficult for the user to have a viewing under a worse wave-receiving condition of terrestrial digital one-segment broadcast waves. For example, a terrestrial digital one-segment broadcast wave may be tried received at the terrestrial digital one-segment/radio receiving section 50 from the broadcast station 8, so that a terrestrial digital one-segment broadcast wave can be determined not receivable when the electric-field intensity and S/N ratio is at a predetermined reference value or smaller.

When a terrestrial digital one-segment broadcast wave is determined receivable at the step S43, the main control section 31 at step S44 controls the terrestrial digital one-segment/radio receiving section 50 to start up the function concerned with a terrestrial digital one-segment broadcast wave. This makes it possible to receive a terrestrial digital one-segment broadcast wave from the broadcast station 8, display a moving picture based on the received terrestrial digital one-segment broadcast wave on the liquid-crystal display 17, and transfer a speech (audio data) based on the received terrestrial digital one-segment broadcast wave to the headset 9 through near-distance wireless communication. Thereafter, the process returns to FIG. 8 thus terminating the multimedia function startup control process. Naturally, the multimedia function established highest in startup priority may be started up without determining a wave-wave-receiving condition (radio-wave condition).

Meanwhile, when determined at the step S43 that a terrestrial digital one-segment broadcast wave is not receivable, the main control section 31 at step S45 determines whether or not the priority n, for use in a multimedia function startup process in priority-based setting, is smaller than 4. When the priority n, for use in a multimedia function startup process in priority-based setting, is determined smaller than 4, the main control section 31 at step S46 increments by 1 the priority n for a multimedia function startup process in priority-based setting (priority n=n+1). Thereafter, the process returns to step S42, to execute the process of step S42 and the following.

Meanwhile, when the multimedia function with a priority n is determined not for "terrestrial digital (function concerned with a terrestrial digital one-segment broadcast wave)" at the step S42, the main control section 31 at step S47 determines whether or not the multimedia function with a priority n is for "digital radio (function concerned with a terrestrial digital radio broadcast wave)" depending upon the priority pattern contained in the setting information (setting information about priority-based setting) about startup setting of multimedia function stored in the storage section 47. Namely, in the case of a priority n=1, determination is made as to whether or not the multimedia function with a priority 1 is for "digital radio (function concerned with a terrestrial digital radio broadcast wave)" depending upon the priority pattern contained in the setting information about priority-based setting. Likewise, in the case of a priority n=2, determination is made as to whether or not the multimedia function with a priority 2 is for "digital radio (function concerned with a terrestrial digital radio broadcast wave)" depending upon the priority pattern contained in the setting information about priority-based setting. This is true for the case of a priority n=3 or 4.

When the multimedia function with a priority n is determined for "digital radio (function concerned with a terrestrial digital radio broadcast wave)" at the step S47, the main control section 31 at step S48 controls the terrestrial digital one-segment/radio receiving section 50 to determine whether or not a terrestrial digital radio broadcast wave is receivable. The concrete determination method is basically similar to the case for a terrestrial digital one-segment broadcast wave at the step S43, the explanation of which is omitted because of duplication.

When determined at the step S48 that a terrestrial digital radio broadcast wave is receivable, the main control section 31 at step S49 controls the terrestrial digital one-segment/radio receiving section 50 to start up the function concerned with a terrestrial digital radio broadcast wave. This makes it possible to receive a terrestrial digital radio broadcast wave from the base station 8 and transfer the speech (audio data) based on the received terrestrial digital radio broadcast wave to the headset 9 through near-distance wireless communication. Thereafter, the process returns to FIG. 8 thus terminating the multimedia function startup/setup control process.

When determined at the step S48 that a terrestrial digital radio broadcast wave is not receivable, the process proceeds to step S45. When the priority n, for use in a multimedia function startup process under priority-based setting, is determined smaller than 4 at the step S45, the priority n is incremented by 1. Thereafter, the process of step S42 and the following is repeatedly executed similarly.

Meanwhile when the multimedia function with a priority n is determined not for "digital radio (function concerned with a terrestrial digital radio broadcast wave)" at the step S47, the main control section 31 at step S50 determines whether or not the multimedia function with a priority n is for "FM radio (function concerned with an FM radio broadcast wave)" depending upon the priority pattern contained in the setting information (setting information concerned with priority-based setting) about startup setting of multimedia function stored in the storage section 47. Namely, in the case of a priority n=1, determination is made as to whether or not the multimedia function with a priority 1 is for "FM radio (function concerned with an FM radio broadcast wave)" depending upon the priority pattern contained in the setting information about priority-based setting. Likewise, in the case of a priority n=2, determination is made as to whether or not the multimedia function with a priority 2 is for "FM radio (function concerned with an FM radio broadcast wave)" depending upon the priority pattern contained in the setting information about priority-based setting. This is true for the case of a priority n=3 or 4.

When the multimedia function with a priority n is determined for "FM radio (function concerned with an FM radio broadcast wave)" at the step S50, the main control section 31 at step S51 controls the FM radio receiving section 50 to determine whether or not an FM radio broadcast wave is receivable. The concrete determination method is basically similar to the case for a terrestrial digital one-segment broadcast wave at the step S43, the explanation of which is omitted because of duplication.

When determined at the step S51 that an FM radio broadcast wave is receivable, the main control section 31 at step S52 controls the FM radio receiving section 51 to start up the function concerned with an FM radio broadcast wave. This makes it possible to receive an FM radio broadcast wave sent from a not-shown broadcast station and transfer the speech (audio data) based on the received FM radio broadcast wave to the headset 9 through near-distance wireless communication. Thereafter, the process returns to FIG. 8 thus terminating the multimedia function startup control process.

Meanwhile, when determined at the step S51 that an FM radio broadcast wave is not receivable, the process proceeds to step S45. When the priority n, for use in a multimedia function startup process under priority-based setting, is determined smaller than 4 at the step S45, the priority n is incremented by 1. Thereafter, the process of step S42 and the following is repeatedly executed similarly.

When the multimedia function with a priority n is determined not for "FM radio (function concerned with an FM radio broadcast wave)" at the step S50, the main control section 31 at step S53 determines whether or not the multimedia function with a priority n is for "music player (function concerned with a music player)" depending upon the priority pattern contained in the setting information (setting information concerned with priority-based setting) about startup setting of multimedia function stored in the storage section 47. Namely, in the case of a priority n=1, determination is made as to whether or not the multimedia function with a priority 1 is for "music player (function concerned with a music player)" depending upon the priority pattern contained in the setting information about priority-based setting. Likewise, in the case of a priority n=2, determination is made as to whether or not the multimedia function with a priority 2 is for "music player (function concerned with a music player)" depending upon the priority pattern contained in the setting information about priority-based setting. This is true for the case of a priority n=3 or 4.

When the multimedia function with a priority n is determined for "music player (function concerned with a music player)" at the step S53, the main control section 31 at step S54 determines whether or not audio data to reproduce with use of the music player function is previously stored in the storage section 47 (whether or not there is audio data to reproduce with use of the music player function). When determined at the step S54 that audio data to reproduce with use of the music player function is previously stored in the storage section 47, the main control section 31 at step S55 controls the music control section 48 to start up the function concerned with a music player. This makes it possible to transfer audio data previously stored in the storage section 47 to the headset 9 through near-distance wireless communication. Thereafter, the process returns to FIG. 8 thus terminating the multimedia function startup control process.

Meanwhile, when determined at the step S54 that audio data to reproduce with use of the music player function is not previously stored in the storage section 47 (when determined that audio data to reproduce is not stored and hence the music player function is not to be reproduced), the process proceeds to step S45. When the priority n, for use in a multimedia function startup process under priority-based setting, is determined smaller than 4 at step S45, the priority n is incremented by 1. Thereafter, the process of step S42 and the following is repeatedly executed similarly.

When the multimedia function with a priority n is determined not for "music player (function concerned with a music player)" at the step S53, the main control section 31 at step S56 executes an error process at step S56. Thereafter, the process returns to FIG. 8 thus terminating the multimedia function startup control process.

Here, referring back to FIG. 8, when the startup setting of multimedia function is determined not in priority-based setting at the step S24, the main control section 31 at step S25 determines whether or not the startup setting of multimedia function is auto setting depending upon the setting information about a startup of multimedia stored in the storage section 47. When the startup setting of multimedia function is determined as auto setting at the step S26, the main control section 31 at step S27 executes a multimedia function startup process in auto setting. The detail of the multimedia function startup process in auto setting is shown in a flowchart of FIG. 11.

Figure 11:
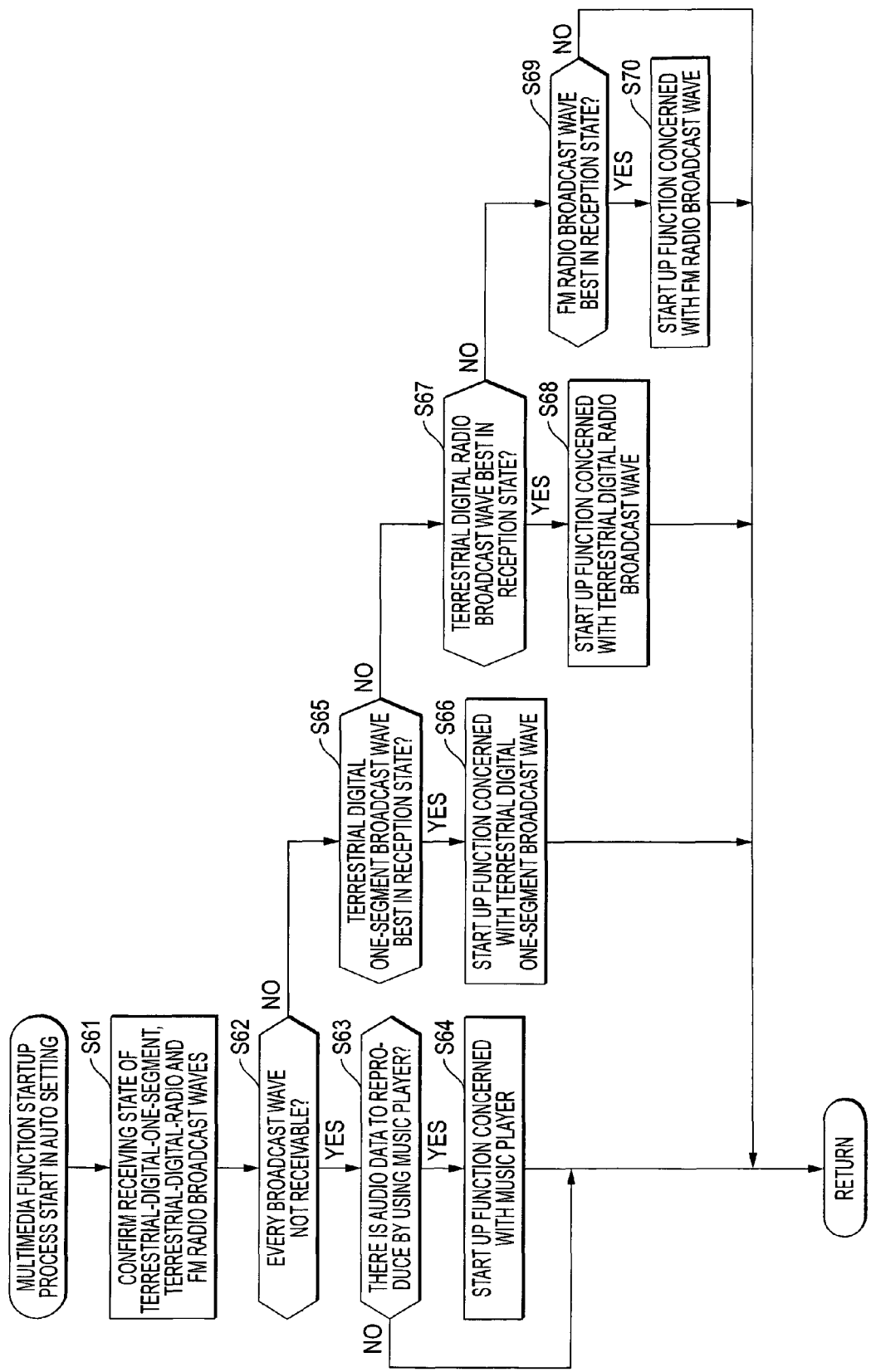
FIG. 11 is an exemplary flowchart explaining the detail of the multimedia function startup setting process under auto setting at step S27 in FIG. 8.

Referring to a flowchart of FIG. 11, explanation is made on a multimedia function startup process in auto setting on the cellular phone 2 of FIG. 4.

At step S61, the main control section 31 controls the terrestrial digital one-segment/radio receiving section 50 and FM radio receiving section 51, to confirm respective wave-wave-receiving conditions of terrestrial digital one-segment, terrestrial digital radio and FM radio broadcast waves. Specifically, the main control section 31 tries to receive a terrestrial digital one-segment or terrestrial digital radio broadcast wave from the broadcast station 8 at its terrestrial digital one-segment/radio receiving section 50 and confirms the acquisition state (state of the presence or absence of a multiplexed signal in the multiplex separating section 38) of a multiplexed signal (elementary stream) at the multiplex separating section 38 at that time. Meanwhile, the main control section 31 at its FM radio receiving section 51, for example, tries to receive an FM radio broadcast wave from a not-shown broadcast station and confirms the reception condition of an FM radio broadcast wave at that time.

At step S62, the main control section 31 determines whether or not every broadcast wave is not to be received depending upon the confirmed reception condition of terrestrial digital one-segment, terrestrial digital radio and FM radio broadcast waves. Namely, determination is made as to whether or not the user is not allowed to view every broadcast wave because of the difficulty for the user to view terrestrial digital one-segment, terrestrial digital radio and FM radio broadcast waves due to worse reception condition thereof. In this case, when the electric-field intensity and S/N ratio of each broadcast wave is equal to or smaller than a predetermined reference value, determination is made that the user is not allowed to view any broadcast wave at all. Thus, determination is that no reception waves are receivable.

Meanwhile, where any is to be received out of terrestrial digital one-segment, terrestrial digital radio and FM radio broadcast waves, determination is not made that the user is not allowed to view any broadcast wave at all. Thus, determination is made that there is no possibility that no broadcast waves are to be received.

When determined at the step S62 that every broadcast wave is not receivable, the main control section 31 at step S63 determines whether or not audio data to reproduce with use of a music player is previously stored in the storage section 47 (whether or not there is audio data to reproduce with use of the music player function). When determined at the step S63 that audio data to reproduce with use of a music player is previously stored in the storage section 47, the main control section 31 at step S64 controls the music control section 48 to start up the function concerned with a music player. This makes it possible to transfer the audio data previously stored in the storage section 47 to the headset 9 through near-distance wireless communication. Thereafter, the process returns to FIG. 8 thus terminating the multimedia function startup control process. Meanwhile, when determined at the step S63 that audio data to reproduce with use of a music player is not previously stored in the storage section 47 (when determined that audio data to reproduce is not held and the music player function is not to be reproduced), the process of step S64 is skipped over. Thereafter, the process returns to FIG. 8 thus terminating the multimedia function startup control process.

When determined at the step S62 that there is no possibility that every broadcast wave is not receivable (i.e. when determined that at least one is receivable of terrestrial digital one-segment, terrestrial digital radio and FM radio broadcast waves), the main control section 31 at step S65 determines whether or not the best one in reception condition of terrestrial digital one-segment, terrestrial digital radio and FM radio broadcast waves is a terrestrial digital one-segment broadcast wave depending upon the reception conditions of the confirmed terrestrial digital one-segment, terrestrial digital radio and FM radio broadcast waves. When determined at the step S65 that the best broadcast wave in respect of reception condition is a terrestrial digital one-segment broadcast wave, the main control section 31 at step S66 controls the terrestrial one-segment/radio receiving section 50 to start up the function concerned with a terrestrial digital one-segment broadcast wave. This makes it possible to receive a terrestrial digital one-segment broadcast wave from the broadcast station 8, display a moving picture based on the received terrestrial digital one-segment broadcast wave on the liquid-crystal display 17, and transfer the speech based on the terrestrial digital one-segment broadcast wave to the headset 9 through near-distance wireless communication. Thereafter, the process returns to FIG. 8 thus terminating the multimedia function startup control process.

Meanwhile, when determined at the step S65 that the best broadcast wave in respect of reception condition is not a terrestrial digital one-segment broadcast wave, the main control section 31 at step S67 determines whether or not the best one in reception condition of terrestrial digital one-segment, terrestrial digital radio and FM radio broadcast waves is a terrestrial digital one-segment broadcast wave depending upon the reception conditions of the confirmed terrestrial digital one-segment, terrestrial digital radio and FM radio broadcast waves. When determined at the step S67 that the best broadcast wave in reception condition is a terrestrial digital one-segment broadcast wave, the main control section 31 at step S68 controls the terrestrial digital one-segment/radio receiving section 50 to start up the function concerned with a terrestrial digital radio broadcast wave. This makes it possible to receive a terrestrial digital radio broadcast wave from the broadcast station 8 and transfer the speech based on the terrestrial digital radio broadcast wave to the headset 9 through near-distance wireless communication. Thereafter, the process returns to FIG. 8 thus terminating the multimedia function startup control process.

Meanwhile, when determined at the step S67 that the best broadcast wave in reception condition is not a terrestrial digital radio broadcast wave, the main control section 31 at step S69 determines whether or not the best broadcast wave in reception condition is an FM radio broadcast wave depending upon the reception conditions of the confirmed terrestrial digital one-segment, terrestrial digital radio and FM radio broadcast waves. When determined at the step S69 that the best broadcast wave in reception condition is an FM radio broadcast wave, the main control section 31 controls the FM radio receiving section 51 to start up the function concerned with an FM radio broadcast wave. This makes it possible to receive an FM radio sent from a not-shown broadcast station and transfer the speech (audio data) based on the received FM radio broadcast wave to the headset 9 through near-distance wireless communication. Thereafter, the process returns to FIG. 8 thus terminating the multimedia function startup control process.

When the best broadcast wave in reception condition is not an FM radio broadcast wave at the step S69, the process returns to FIG. 8 thus terminating the multimedia function startup control process.

Referring back to FIG. 8, when the startup setting of multimedia function is determined not as auto setting at the step S26, the main control section 31 at step S28 performs an error process. Thereafter, the process returns to FIG. 8 thus terminating the multimedia function startup control process.

In the present embodiment, in the case a plurality of multimedia functions are installed on the cellular phone 2, startup setting is made to start up any one of a plurality of multimedia functions depending upon the remote-control command sent from the remote control 10 of the counterpart headset 9 through wireless communication. When receiving the remote-control command sent from the remote control 10 of the headset 9 through wireless communication, determination is made as to which one of fixed setting, priority-based setting and auto setting the startup setting of multimedia function is. Depending upon the determination result thereof, control is possible for a startup of multimedia function installed on the cellular phone 2.

For example, when the startup setting of multimedia function is determined as fixed setting, it is possible to execute a multimedia function startup process in fixed setting. This can startup, without fail, the multimedia function previously established fixedly by user's operation.

Meanwhile, the startup setting of multimedia function is determined as priority-based setting, a multimedia startup process can be executed under priority-based setting. This makes it possible to start up the best suited multimedia function in accordance with a combination of a startup priority previously established by user's operation and a reception condition of radio waves (or in accordance with a startup priority only). Furthermore, the startup setting of multimedia function is determined as auto setting, a multimedia function startup process can be executed under auto setting. This allows for starting up the best one in respect of reception condition out of multimedia functions existing in plurality.

Accordingly, even where using an existing remote control 10 (headset 9), any can be suitably started up out of a plurality of multimedia functions. This accordingly can improve the convenience in starting up the multimedia function, installed on the cellular phone 2, by use of the remote control 10.

Incidentally, in the multimedia function startup process in auto setting shown in FIG. 11, the best multimedia function in reception condition is started up after confirming the reception conditions of terrestrial digital one-segment, terrestrial digital radio and FM radio broadcast waves. However, this is not limitative. For example, as shown in a flowchart of FIG. 12, the multimedia function may be started up which has been started up the latest (started up in the last) and is possible for the user to use again. In this case, if the reception condition is not well, the multimedia function startup process may be executed under the priority-based setting, explained with use of FIG. 1, based on a priority previously established.

Figure 12:
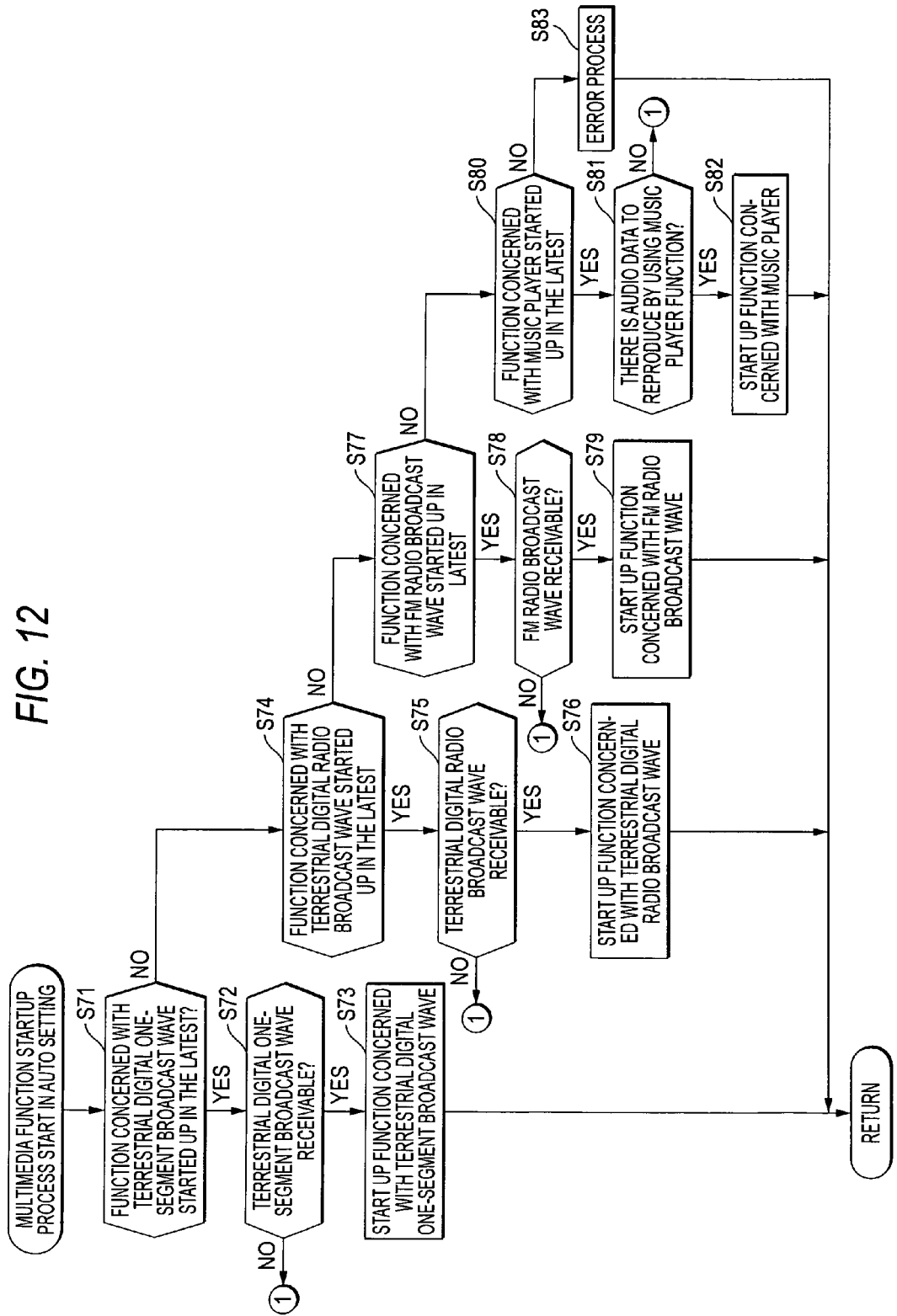
FIG. 12 is an exemplary flowchart explaining the detail of the multimedia function startup setting process under another of auto setting at step S27 in FIG. 8.

Specifically, at steps S71, S74, S77 and S80 in the process of FIG. 12, determination is made as to whether the multimedia function started up in the latest is a function concerned with a terrestrial digital one-segment broadcast wave, a function concerned with a terrestrial digital radio broadcast wave, a function concerned with an FM radio broadcast wave or a function concerned with a music player. For example, when the multimedia function started up in the latest is determined as a function concerned with a terrestrial digital one-segment broadcast wave, determination is made as to whether or not a terrestrial digital one-segment broadcast wave is receivable (step S72). When determined that a terrestrial digital one-segment broadcast wave is receivable, started up is the function concerned with a terrestrial digital one-segment broadcast wave (step S73). Meanwhile, when determined that a terrestrial digital one-segment broadcast wave is not receivable, the process proceeds to step S25 in FIG. 8, to execute a multimedia function startup process under priority-based setting as shown in FIG. 10. Incidentally, this is true for the case that the multimedia function started up in the latest is determined as other than the function concerned with a terrestrial digital one-segment broadcast wave.

Due to this, the multimedia function started up in the last (started up in the latest) can be started up. Furthermore, by combining the wave-receiving conditions, the multimedia function can be started up optimally. Accordingly, even where the existing remote control 10 (headset 9) is used, any suitable one of a plurality of multimedia functions can be started up. Therefore, convenience can be improved in starting up the multimedia function, installed on the cellular phone 2, by use of the remote control 10. Naturally, the multimedia function started up in the last (started up in the latest) may be started up at all times regardless of the wave-receiving condition thereof.

Besides the cellular phone 2, the embodiment a is applicable to a PDA (personal digital assistant), a personal computer, a portable game player, a portable music reproducer, a portable moving-picture reproducer or another information processing apparatus.

A series of processes explained in the embodiment can be executed not only on hardware but also on hardware.

In the embodiment of the invention, the flowchart steps are exemplified with the process executed chronologically in the described order. However, those include a process to be executed in parallel or separately even where not necessarily processed chronologically.

What is claimed is:

1. An information processing apparatus in which a plurality of multimedia functions are installed and which is capable of wireless communicating a counterpart apparatus, comprising:
    a setting unit configured to specify a method by which a multimedia function is selected from the plurality of multimedia functions; and
    a control unit configured to start up a multimedia function selected by the specified method upon receiving a remote-control command sent from the counterpart apparatus,
    wherein the setting unit selects from a fixed setting method, a priority-based setting method and an auto setting method as the specified method in response to a user operation,
    wherein the fixed setting method comprises starting up one of the plurality of multimedia functions that is pre-selected and fixed in advance by a user operation, the priority-based setting method comprises starting up one of the plurality of multimedia functions that is selected according to a priority order preset by a user operation, and the auto setting method comprises starting up one of the plurality of multimedia functions that is automatically selected in response to a radio-wave-reception condition existing at a time of starting up.

2. The information processing apparatus according to claim 1, wherein, the control unit starts up a multimedia function that has a best radio-wave-reception condition among a plurality of broadcast waves.

3. The information processing apparatus according to claim 2, wherein, upon detecting that all the broadcast waves are not receivable, the control unit starts up a multimedia function that does not use any one of the plurality of broadcast waves.

* * * * *